United States Patent [19]

Howard

[11] 4,077,312

[45] Mar. 7, 1978

[54] DEVICE FOR IMPARTING SMOKE FLAVOR TO LIQUIDS

[76] Inventor: Wesley E. Howard, 4000 Adams, Kansas City, Kans. 66103

[21] Appl. No.: 735,384

[22] Filed: Oct. 26, 1976

Related U.S. Application Data

[63] Continuation-in-part of Ser. No. 682,756, May 3, 1976, abandoned.

[51] Int. Cl.² .................. A23B 1/00; B01D 19/00; B01D 39/00; B01D 41/00
[52] U.S. Cl. ........................................ 99/471; 55/241
[58] Field of Search .................. 99/312–314, 99/310, 516, 467, 471, 477, 482; 261/91, 111, 115, 119 R, DIG. 79; 426/312, 314, 317; 126/383, 385–386; 55/240–241, 228

[56] References Cited

U.S. PATENT DOCUMENTS

| 1,498,408 | 6/1924 | Stoms | 261/111 |
|---|---|---|---|
| 3,152,914 | 10/1964 | Taylor | 426/314 |
| 3,396,654 | 8/1968 | Heden | 99/314 |
| 3,699,748 | 10/1972 | Barkovitz | 55/241 |
| 3,797,809 | 3/1974 | Sydnor | 261/91 |

*Primary Examiner*—Harvey C. Hornsby
*Assistant Examiner*—Robert Pous
*Attorney, Agent, or Firm*—Lowe, Kokjer, Kircher, Wharton & Bowman

[57] ABSTRACT

A device which raises liquid food from a container and drops it through circulating smoke back into the container to impart a smoke flavor to the liquid. A pump or conveyor draws the liquid from the bottom of the container and forces it upwardly through a vertical conduit which terminates at its top end in a flared outlet located well above the container. An adjustable hood surrounds the conduit outlet to deflect the liquid back into the container without spilling. Conical baffles mounted on the conduit serve to deflect the liquid and increase its exposure time to the smoke.

10 Claims, 5 Drawing Figures

DEVICE FOR IMPARTING SMOKE FLAVOR TO LIQUIDS

BACKGROUND AND SUMMARY OF THE INVENTION

This application is a continuation-in-part of application, Ser. No. 682,756, filed May 3, 1976 and now abandoned.

This invention relates generally to the smoke treatment of foods and deals more specifically with an improved device that is used to impart a smoked flavor to liquid foods.

The desirability of providing food with a smoke flavor has long been recognized, and equipment of various types has been developed to carry out the smoke treatment. For the most part, this equipment is constructed to smoke solid foods such as meat and the like. Devices which have been developed for smoking soft or liquid foods have not been wholly satisfactory in a number of respects, primarily in their complexity and cost and because they are unable to expose the liquid to the smoke in a thorough and uniform manner.

For example, in the smoke treatment disclosed in U.S. Pat. No. 2,464,614 which issued to Sala, the smoke is passed through the liquid, which tends to cause the formation of smoke "beads" in the liquid. These beads of smoke impart a harsh, bitter taste to the food. Furthermore, the smoke cannot be passed through the liquid in a manner that is sufficiently uniform to result in an even smoke treatment of the food.

Another type of device which has been employed in the past operates in a smoke filled area to elevate the liquid above a container and drop it through the smoke back into the container. Such a device is disclosed in the Ogle U.S. Pat. No. 3,232,210 which provides a dipper arrangement for scooping up and raising the liquid. Although equipment of this nature avoids the passage of smoke through the liquid and thus eliminates the problem of smoke beads, additional difficulties are encountered. The rate at which the liquid is smoke treated is relatively slow because it depends on the dipper size and rotational speed, both of which are limited by practical considerations. Moreover, the height to which the liquid can be raised is limited by the length of the dipper arms, which is in turn limited by the size and depth of the container. Such physical limitations detract from the thoroughness and the effectiveness of the smoke treatment, since the exposure of the liquid to the smoke depends ultimately on the distance through which the liquid falls.

Existing units are further deficient in that they do not assure that all of the liquid is raised and dropped through the smoke. The same liquid may be scooped up and returned to the container repeatedly, while the remainder of the liquid always remain in the container. As a result, the thoroughness and eveness of the smoke treatment is lacking, particularly in the case of heavy viscous liquids which are difficult to mix and circulate.

It is the primary object of the present invention to provide a device for smoke treating liquid foods which is improved over existing devices in regard to its ability to thoroughly and evenly smoke the liquid.

More specifically, it is an object of the invention to provide a device which elevates and drops liquid food downwardly through circulating smoke in order to avoid the smoke "beads" that tend to occur in units which operate to pass the smoke through the liquid.

Another object of the invention is to provide a device of the character described which employs a pump or conveyor for raising of the liquid. The use of a pump or conveyor results in there being virtually no limitation as to the height to which the liquid may be raised, so that its exposure time to the smoke may be as long as desired.

Still another object of the invention is to provide a device of the character described which draws the liquid from the bottom of the container and returns it to the top thereof, thus assuring complete liquid circulation and exposure of substantially all of the liquid to smoke.

A further object of the invention is to provide a device of the character described which includes a unique hood member that deflects the liquid back into the container without the possibility of liquid loss through spilling.

An additional object of the invention is to provide a device of the character described in which baffles are included to assist in directing the liquid back into the container and to increase its exposure time to the smoke.

Yet another object of the invention is to provide a device of the character described in which the hood and baffles are adjustable so as to accommodate different liquids, and in which removable plugs serve to control the liquid flow as desired.

A still further object of the invention is to provide a device of the character described which is simple and economical to construct and operate and which is easily disassembled for cleaning and other purposes.

Another object of the invention is to provide a device of the character described which is readily adaptable for cooking or mixing liquid foods, as well as for smoke treatment operations.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts of the various views.

Figure 1:
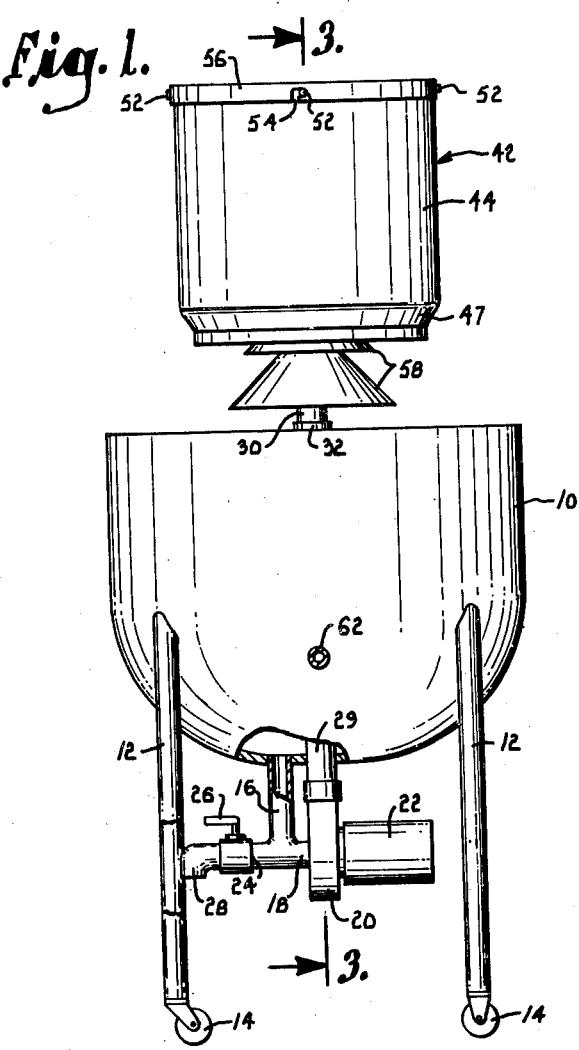
FIG. 1 is an elevational view of a device constructed according to the present invention, with a portion shown in cross section for illustrative purposes.
Figure 2:
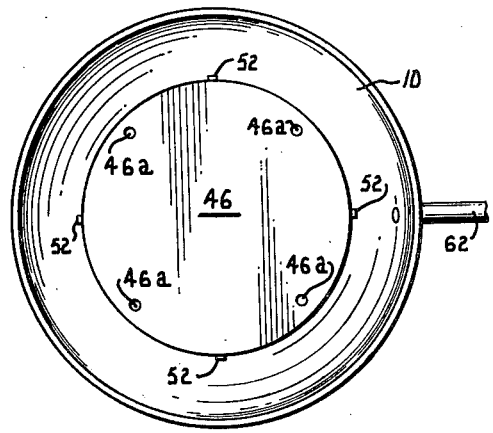
FIG. 2 is a top plan view of the device shown in FIG. 1.

Referring now to the drawing in detail, the preferred embodiment of the invention is shown in FIGS. 1-4 wherein the numeral 10 designates a pot that serves as a container for the liquid which is to be smoke treated in accordance with the invention. Pot 10 is a kettle shaped container which is open at the top. Four upright legs 12 extend below the pot to support it above the floor of a smokehouse or other smoke filled enclosure (not shown) within which the unit is normally used. Swivel wheel assemblies 14 mounted on the lower ends of legs 12 permit the pot to be wheeled into and out of the smokehouse.

A relatively short pipe 16 provides an outlet through which the liquid is drawn from the pot. Pipe 16 is secured to the bottom of the pot in communication with the interior thereof. Pipe 16 extends vertically below the pot and connects at its bottom end with a short horizontal pipe 18 which leads to the intake of a conventional liquid pump 20 which is preferably a reversible pump for a purpose that will be explained more fully. A three speed electric motor 22 preferably drives the pump 20 in a conventional manner. A drain pipe 24 which is equipped with a valve 26 leads from the lower end of pipe 16 in a direction away from pipe 18. Valve 26 is normally closed so that the liquid is unable to flow out of the downwardly directed spout 28 on the end of drain pipe 24.

Figure 3:
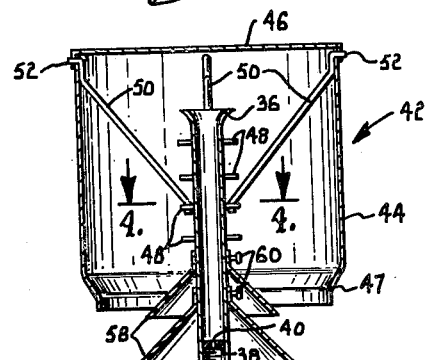
FIG. 3 is a cross sectional view taken generally along line 3—3 of FIG. 1 in the direction of the arrows.

The discharge side of pump 20 connects in threaded fashion with the lower end of a threaded fitting 29 which extends through the bottom central portion of pot 10. Fitting 29 is welded or otherwise connected in leakproof fashion with the bottom of the pot and is threaded on its upper end to receive the lower end of an upstanding pipe 30. Pipe 30 extends vertically within pot 10 centrally thereof and terminates at approximately the height of the circular upper rim of the pot. With reference to FIG. 3, a short sleeve 32 is fit on pipe 30 to extend a short distance above the top end thereof. The upper portion of sleeve 32 above pipe 30 is internally threaded in order to receive another vertical pipe 34 which is externally threaded. Pipe 34 forms essentially an upward continuation of pipe 30. The upper or outlet end 36 of pipe 34 is enlarged in outwardly flared fashion to present an outlet for the liquid which is pumped upwardly through pipes 30 and 34 by pump 20.

With continued reference to FIG. 3, a pair of plugs 38 are threaded in order to be inserted within the pipes 30 and 34, respectively. Pipes 30 and 34 are internally threaded at their adjacent ends to receive plugs 38. Plugs 38 are each provided with a relatively small central opening 40 which is much less in size than the diameter of pipes 30 and 34. When installed in the pipes, plugs 38 therefore serve to restrict the area presented to the liquid that is flowing through the pipes.

A hood generally designated by numeral 43, is supported by pipe 34 in position to surround the flared outlet 36 thereof. Hood 42 is an open bottom member having a generally cylindrical side section 44 and a flat circular cover 46 which fits on top of the side section 44. Section 44 is considerably smaller in diameter than the diameter of the upper rim of pot 10. The lower end 47 of section 44 is bent inwardly in order to assure that liquid falling within the hood is directed back into the pot without spilling. Four vent openings 46a (FIG. 2) are formed through cover 46 to accommodate the circulation of smoke within hood 42.

Figure 4:
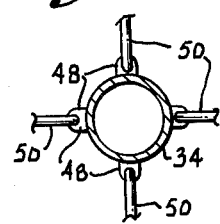
FIG. 4 is a fragmentary cross sectional view on an enlarged scale taken generally along line 4—4 of FIG. 3 in the direction of the arrows.
Figure 4:
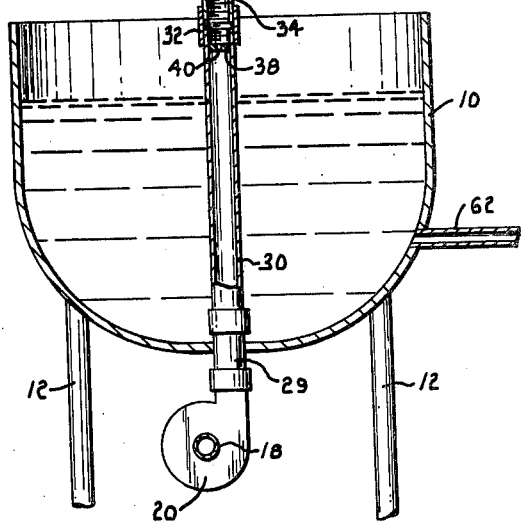

As illustrated in FIGS. 3 and 4, a plurality of lug sets are provided for mounting of hood 42. Each lug set comprises four lugs 48 which are secured to pipe 34 in outward projection therefrom. The sets of lugs 48 are spaced vertically from one another to provide for vertical adjustment of hood 42, as will become clear. Each lug 48 is apertured in order to receive the vertically bent lower end of a rod like brace 50. The four braces 50 angle outwardly and upwardly from their respective lugs at 90° spacing from one another and are welded or otherwise rigidly secured at their top ends against the inside top portion of hood section 44. With the lower ends of braces 50 inserted through lugs 48 and secured thereto by wing nuts or the like (not shown), hood 42 is supported from pipe 34 at a position to surround outlet 36, with cover 46 spaced above the outlet and side section 44 located outwardly thereof.

Hood 42 may be lifted to withdraw the lower ends of braces 50 from lugs 48 after removal of the wing nuts (not shown). Subsequent insertion of the lower ends of braces 50 in a different set of lugs 48 and the tightening of the wing nuts supports hood 42 at a different elevation in order to vary the distance of cover 46 above outlet 36. Outlet 36 is located within the hollow interior of hood 42 at all positions of the latter, and the hood is always spaced well above the top of pot 10.

The upper end 52 of each brace 50 is bent horizontally to extend outwardly through side section 44 near the top thereof. To secure cover 46 on section 44, the brace ends 52 are received in L-shaped slots 54 (FIG. 1) which are formed in a flange 56 that extends downwardly from the periphery of cover 46. The connection provided by the brace ends 52 and the slots 54 permits the cover to be rotated slightly to align ends 52 with the vertical portions of slots 54, so that the cover may then simply be lifted off of section 44 for cleaning.

A pair of conically shaped baffles 58 are mounted on pipe 34 and are adjustable as to their vertical positions thereon. Each baffle 58 has an inclined surface which is oriented to direct liquid falling within hood 42 downwardly and outwardly into pot 10. The upper portion of each baffle 58 is cylindrical in order to be sleeved around pipe 34 and secured thereto by a thumb screw 60. This manner of mounting of the baffles permits them to be vertically adjusted in order to accommodate various liquids. The lower baffle 58 is usually positioned between pot 10 and hood 42 and is preferably slightly larger than the upper baffle. A pair of baffles are preferably provided so that two successive surfaces are presented for the liquid to run off, thus increasing the exposure time of the liquid to the circulating smoke.

A pipe fitting 62 is secured to one side of pot 10 in communication with the interior thereof. Fitting 62 is adapted to connect with a flexible hose or another elongate member (not shown) that is able to extend out of the smokehouse in which the device is used. Liquid can therefore be drawn off through fitting 62 and the hose for sampling of its taste outside of the smokehouse.

In use, the liquid to which a smoke flavor is to be imparted is poured into pot 10. The unit is wheeled into a smokehouse or other enclosure (not shown) within which smoke is circulated. The circulating smoke passes through the open space between pot 10 and hood 42 and also circulates within the hood, with the vent openings 46a in cover 46 facilitating such circulation. When pump 20 is started and set at a rather high speed, it begins to draw liquid out the bottom of the pot through pipes 16 and 18 and to pump it upwardly through pipes 30 and 34. Due to the flared configuration of the pipe outlet 36, the liquid discharges therefrom generally upwardly and outwardly in a thin symmetrical pattern that enables it to readily mix with the circulating smoke. The liquid which contacts cover 46 and side section 44 of the hood is deflected downwardly within the hood member 42 and back into the pot. The liquid that runs down the internal side walls of the hood encounters the inwardly bent portion 47 and is directed inwardly somewhat to assure that it returns to pot 10 without spilling. The liquid that encounters baffles 58 runs down both of the inclined conical baffle surfaces and is thus exposed to the smoke for an extended period of time prior to falling back into the pot.

Pump 20 continues to circulate the liquid upwardly through pipes 30 and 34 until the desired smoke flavor has been imparted to the liquid, as determined by sampling liquid which is drawn from pot 10 through fitting 62. When the smoke treatment has been completed, the unit may be rolled out of the smokehouse, and valve 26 may be opened to drain the liquid out of the pot through the drain pipe 24 and its spout 28. It is noted that pump 20 draws liquid from the extreme bottom portion of pot 10, and that the liquid returns to the pot at the extreme top thereof. Accordingly, substantially all of the liquid is eventually pumped through pipes 30 and 34 so that the liquid is smoke treated thoroughly and uniformly.

To pump the liquid out of pot 10 through drain pipe 24 at a relatively high flow rate, pipe 30 is unthreaded from fitting 29 and pump 20 is adjusted so that its pumping action is reversed from the direction it pumps during smoking of the liquid. A plug (not shown) is inserted in pipe 16, preferably in threaded fashion. Pump 20 then acts to draw liquid from pot 10 downwardly through fitting 29 and to pump it out through drain pipe 24 into a container (not shown) positioned below the spout 28.

As previously indicated, the height at which hood 42 is supported may be adjusted by means of lugs 48 and braces 50. When a relatively heavy, viscous liquid is to be smoke treated, the hood is preferably set at a relatively low height since the heavy liquid will not splash significantly. Baffles 58 may also be adjusted in elevation in order to accommodate liquids of various weights and viscosities. Plugs 38 may be installed when it is desired to restrict the flow rate through the pipes.

Hood 42 may be easily lifted off for cleaning, and cover 46 is removable from the hood for the same purpose. Also, pipe 34 may be unscrewed for cleaning and baffles 58 may be slid off of the pipe upon loosening of the screws 60. Pipe 34 may be of any length desired which will result in adequate exposure of the liquid to smoke. In this regard, pump 20 preferably has sufficient power to pump the liquid upwardly through a pipe that is substantially longer than that illustrated in the drawing.

Figure 5:
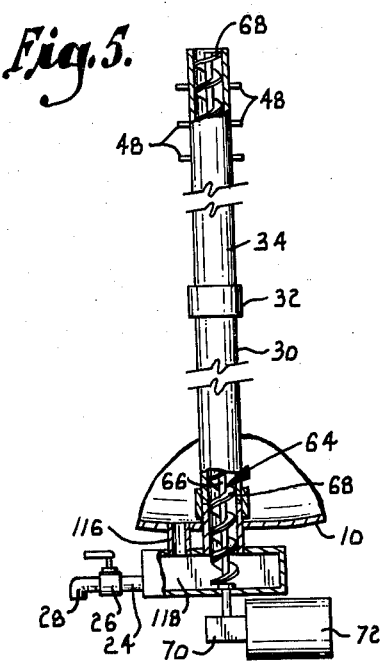
FIG. 5 is a fragmentary, elevational view, partially in cross section showing an alternative embodiment of the invention.

An alternative embodiment of the invention is illustrated in FIG. 5 and will now be described. In this embodiment, pipes 30 and 34 are again mounted in container 10 in the same manner as described above for the preferred embodiment. A relatively short pipe 116 provides an outlet from the bottom of the container and communicates with a short horizontal pipe 118 which serves as a liquid reservoir. Also communicating with pipe 118 is a drain pipe 24, an outlet valve 26, and a spout 28 as previously described for the preferred embodiment. Communicating with the interior of pipe 118 is a liquid conveyor designated generally by the numeral 64. Conveyor 64 comprises a shaft 66 and spiral flighting 68. Shaft 66 extends through pipe 118 to a gear box 70 that is driven by an electric motor 72. Manifestly, flighting 68 may be constructed from rubber or other flexible material so as to form a seal with the interior of pipes 30 and 34.

Operation of the alternative embodiment of the invention is the same as described above for the preferred embodiment except for the fact that the liquid is moved upwardly by conveyor 64. The conveyor may be turned at a relatively high rate of speed to throw the liquid against hood 42 with some force.

The device may also be used simply for mixing or cooking of liquid. In this case, pipe 34 and all of the structures supported thereon will be removed and replaced by a single short pipe (not shown) which preferably extends only slightly above the top of the pot and which is provided with a plurality of side outlets. Pump 20 is preferably set at a relatively low speed so that the liquid is pumped slowly through the short pipe (not shown) in order to be circulated for thorough mixing or cooking.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. Apparatus adapted for use in a smoky environment at atmospheric pressure and temperature to impart smoke flavor to a prepared liquid food product, said apparatus comprising:
    an open topped container for containing the liquid food product;
    a liquid conduit communicating with said container near the center of the latter and extending thereabove, said conduit having an upwardly facing outlet located above said container and facing away from said container;
    means for forcing said liquid food product from the container through said conduit and out of the outlet thereof at atmospheric temperature, said means imparting sufficient velocity to said liquid food product to force the latter upwardly and outwardly away from said outlet;
    a hood member open at the bottom and having a top located above said outlet and sides for deflecting liquid flowing out of the conduit outlet; and
    means supporting said hood member above said container with the outlet of said conduit disposed within the sides of said hood member and below the top thereof.

2. Apparatus as set forth in claim 1, wherein said container has a bottom portion, and including an outlet conduit for said container communicating therewith at said bottom portion, said means for moving said liquid communicating with said outlet conduit to draw liquid from the bottom portion of said container for passage through said liquid conduit.

3. Apparatus as set forth in claim 1, including means for adjusting the vertical position of said hood member to vary the distance of its top above said conduit outlet.

4. Apparatus as set forth in claim 1, including at least one baffle and means for supporting said baffle in a stationary position generally between said container and hood member, said baffle presenting an inclined surface for deflecting liquid falling from within said hood member to increase the exposure time of the liquid to the smoke.

5. Apparatus as set forth in claim 4, wherein said inclined surface is a generally conically shaped surface sloping downwardly and outwardly from a location substantially centered above said container.

6. Apparatus as set forth in claim 4, including a second baffle presenting an inclined surface for deflecting liquid, and means for supporting said second baffle with its inclined surface located below that of said one baffle, whereby the liquid deflects off of the inclined surface of each baffle.

7. Apparatus as set forth in claim 4, including means for adjusting the vertical position of said baffle to vary the distance of its inclined surface above said container.

8. Apparatus as set forth in claim 1, wherein said means for moving said liquid comprises pump means having an intake disposed in communication with said container and a discharge disposed in communication with said conduit.

9. Apparatus as set forth in claim 1, including at least one plug member adapted to be inserted in said conduit, said plug member having an opening therethrough which presents a restricted area to liquid flow relative to the area presented by said conduit, said plug member thereby restricting the liquid flow through said conduit when inserted therein.

10. Apparatus as set forth in claim 1, including a drain communicating with said container for discharging the liquid therefrom, said pump being disposed in communication with said drain and being selectively operable to pump liquid therethrough.

* * * * *